(12) United States Patent
Foege

(10) Patent No.: US 9,726,121 B2
(45) Date of Patent: Aug. 8, 2017

(54) ENGINE SYSTEM HAVING REDUCED PRESSURE EGR SYSTEM

(71) Applicant: Electro-Motive Diesel Inc., LaGrange, IL (US)

(72) Inventor: Aaron Gamache Foege, Westmont, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 309 days.

(21) Appl. No.: 14/675,577

(22) Filed: Mar. 31, 2015

(65) Prior Publication Data
US 2016/0290287 A1 Oct. 6, 2016

(51) Int. Cl.
| | |
|---|---|
| *F02D 23/00* | (2006.01) |
| *F02M 26/08* | (2016.01) |
| *F02M 26/43* | (2016.01) |
| *F02M 35/116* | (2006.01) |
| *F02B 37/00* | (2006.01) |
| *F02B 37/007* | (2006.01) |

(Continued)

(52) U.S. Cl.
CPC ........... *F02M 26/08* (2016.02); *F02B 37/004* (2013.01); *F02B 37/007* (2013.01); *F02B 39/04* (2013.01); *F02B 39/12* (2013.01); *F02M 26/43* (2016.02); *F02M 35/10045* (2013.01); *F02M 35/10065* (2013.01); *F02M 35/116* (2013.01); *F02M 26/23* (2016.02)

(58) Field of Classification Search
CPC .. F02M 26/08; F02M 26/43; F02M 35/10045; F02M 35/10065; F02B 37/004; F02B 37/007

USPC ....... 60/602, 605.2, 611; 123/568.11, 568.12
See application file for complete search history.

(56) References Cited

U.S. PATENT DOCUMENTS

| | | | | |
|---|---|---|---|---|
| 4,345,571 A | * | 8/1982 | Iizuka | F02D 17/02 123/198 F |
| 4,354,471 A | * | 10/1982 | Sugasawa | F02D 17/02 123/198 F |

(Continued)

FOREIGN PATENT DOCUMENTS

| | | |
|---|---|---|
| DE | 19717846 A1 | 11/1998 |
| WO | WO 2014/005127 A2 | 1/2014 |

*Primary Examiner* — Phutthiwat Wongwian
*Assistant Examiner* — Ngoc T Nguyen
(74) *Attorney, Agent, or Firm* — Finnegan, Henderson, Farabow, Garrett, Dunner, LLP

(57) ABSTRACT

An engine system having donor cylinders and non-donor cylinders is disclosed. The engine system may have a first intake manifold configured to distribute air into the non-donor cylinders, and a second intake manifold configured to distribute air into the donor cylinders. The engine system may also have a first exhaust manifold configured to discharge exhaust from the non-donor cylinders to the atmosphere, and a second exhaust manifold separate from the first exhaust manifold and configured to recirculate exhaust from the donor cylinders to the first intake manifold. The engine system may further have an orifice disposed in between the first intake manifold and the second intake manifold. The orifice may be configured to regulate a flow rate of fluid flowing from the first intake manifold to the second intake manifold. The engine system may further have a controller configured to selectively control the orifice in response to a desired exhaust gas recirculation operating condition.

20 Claims, 1 Drawing Sheet

(51) Int. Cl.
  *F02B 39/04* (2006.01)
  *F02B 39/12* (2006.01)
  *F02M 35/10* (2006.01)
  *F02M 26/23* (2016.01)

(56) References Cited

U.S. PATENT DOCUMENTS

| | | | | |
|---|---|---|---|---|
| 4,364,345 A | * | 12/1982 | Tsutsumi | F02D 17/02 |
| | | | | 123/198 F |
| 4,365,597 A | * | 12/1982 | Iizuka | F02D 17/02 |
| | | | | 123/198 F |
| 4,365,598 A | * | 12/1982 | Sugasawa | F02D 17/02 |
| | | | | 123/198 F |
| 4,368,700 A | * | 1/1983 | Sugasawa | F02D 17/02 |
| | | | | 123/198 F |
| 4,376,426 A | * | 3/1983 | Iizuka | F02D 41/0087 |
| | | | | 123/198 F |
| 4,411,228 A | * | 10/1983 | Sugasawa | F02D 17/02 |
| | | | | 123/198 F |
| 4,459,960 A | * | 7/1984 | Ueno | F02D 17/02 |
| | | | | 123/198 F |
| 4,462,351 A | * | 7/1984 | Fujii | F02D 17/02 |
| | | | | 123/198 F |
| 4,484,548 A | * | 11/1984 | Sugasawa | F02D 41/0055 |
| | | | | 123/198 F |
| 7,490,462 B2 | * | 2/2009 | Roozenboom | F02M 26/42 |
| | | | | 123/562 |
| 8,857,156 B2 | | 10/2014 | Primus et al. | |
| 8,931,256 B2 | | 1/2015 | Moravec et al. | |
| 2005/0000497 A1 | | 1/2005 | Nakai et al. | |
| 2006/0248888 A1 | | 11/2006 | Geskes | |
| 2007/0137615 A1 | | 6/2007 | Benz et al. | |
| 2011/0155111 A1 | | 6/2011 | Heilenbach et al. | |
| 2012/0222659 A1 | | 9/2012 | Kulkarni et al. | |
| 2013/0081392 A1 | | 4/2013 | Klingbeil | |
| 2013/0104542 A1 | | 5/2013 | Klingbeil | |
| 2014/0069272 A1 | | 3/2014 | Cryer et al. | |
| 2014/0174078 A1 | | 6/2014 | Bandyopadhyay et al. | |
| 2014/0208717 A1 | * | 7/2014 | Moravec | F02M 26/43 |
| | | | | 60/274 |
| 2014/0208742 A1 | * | 7/2014 | Bandyopadhyay | F02B 29/0412 |
| | | | | 60/605.1 |
| 2014/0209073 A1 | | 7/2014 | Johnson | |
| 2014/0260193 A1 | * | 9/2014 | Moravec | F02M 26/43 |
| | | | | 60/274 |
| 2014/0331978 A1 | * | 11/2014 | Goetzke | F02M 26/43 |
| | | | | 123/568.12 |
| 2014/0352672 A1 | | 12/2014 | Goetzke et al. | |

* cited by examiner

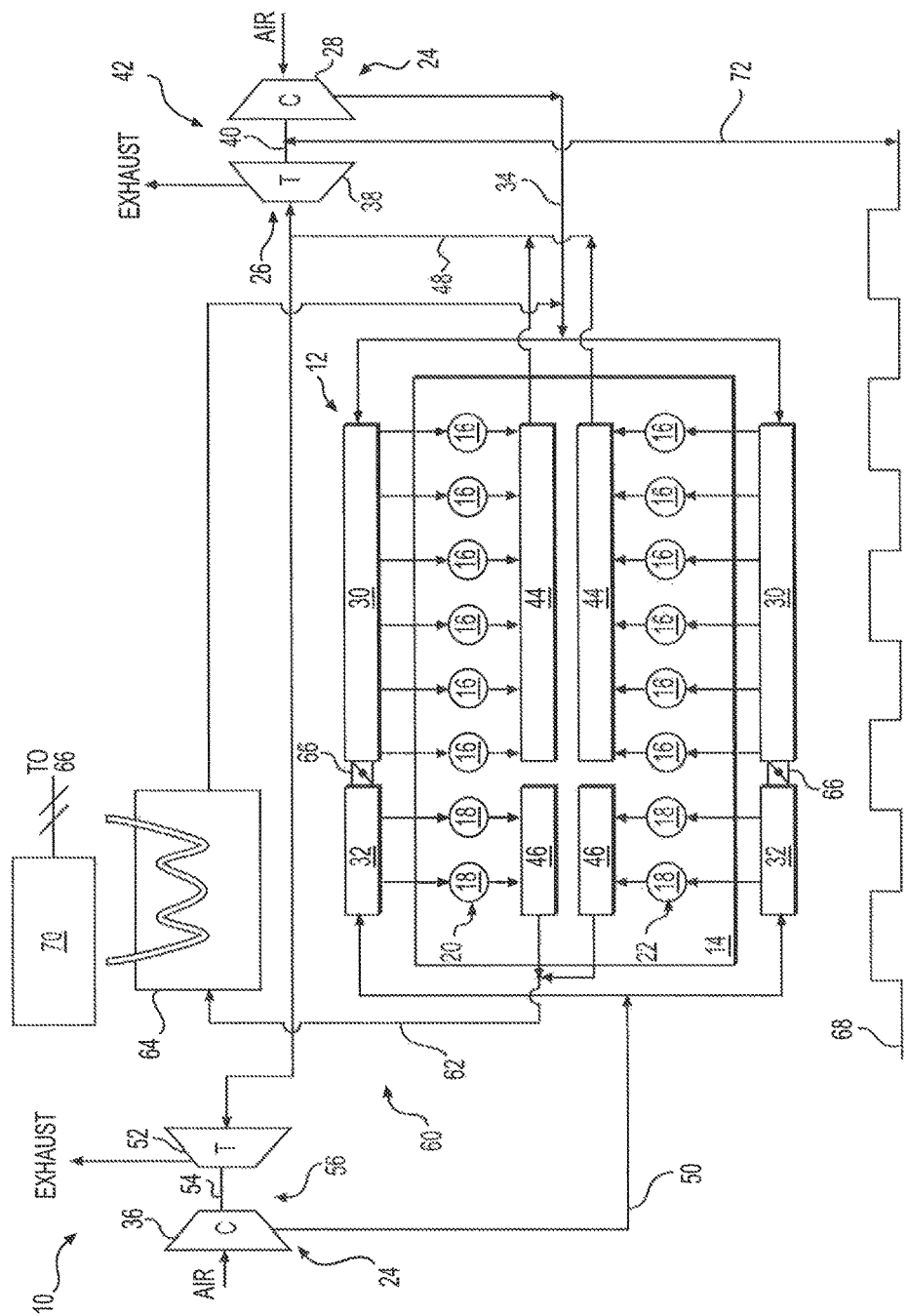

ENGINE SYSTEM HAVING REDUCED PRESSURE EGR SYSTEM

TECHNICAL FIELD

The present disclosure relates generally to an engine system and, more particularly, to an engine system having a reduced pressure within an exhaust gas recirculation (EGR) system.

BACKGROUND

Combustion engines such as diesel engines, gasoline engines, and gaseous fuel-powered engines are supplied with a mixture of air and fuel for combustion within the engine that generates a mechanical power output and a flow of exhaust gases. The exhaust gases can include a complex mixture of air pollutants produced as byproducts of the combustion process. For example, an engine can produce NOx, particulate matter, and hydrocarbons. Due to increased attention on the environment, the amount of pollutants emitted to the atmosphere from an engine can be regulated depending on the type of engine, size of engine, and/or class of engine.

One method that has been implemented by engine manufacturers to comply with the regulation of exhaust emissions includes exhaust gas recirculation (EGR). EGR is the recirculation of a portion of the exhaust gas produced by the engine back to the intake of the engine to mix with fresh combustion air. The resulting mixture, when ignited, produces a lower combustion temperature and a corresponding reduced amount of NOx.

An exemplary EGR system is disclosed in U.S. Patent Application Publication No. US 2012/0222659 A1 to Kulkarni et al. that published on Sep. 6, 2012 ("the '659 publication"). The '659 publication discloses a four-stroke engine having a plurality of donor cylinders and a plurality of non-donor cylinders. Exhaust gases from the non-donor cylinders are directed to a first exhaust manifold, which routes the exhaust gases through a turbine and to the atmosphere. Exhaust gases from the donor cylinders are directed to a second exhaust manifold, which routes the exhaust gases through an exhaust gas recirculation (EGR) system and into an intake passage for both the donor and non-donor cylinders. The EGR system includes an EGR cooler to cool the exhaust gases before the exhaust gases return to the intake passage. The donor and non-donor cylinders are positioned in two banks of cylinders, with some donor cylinders arranged in between non-donor cylinders along each of the two banks of cylinders. In addition, two or more of the donor cylinders may be positioned immediately adjacent one another at a middle point along one of the two banks of cylinders, in order to reduce engine noise and vibration and to reduce a size of the second exhaust manifold, which routes exhaust gas from the donor cylinders to the intake passage of the engine.

Although the system of the '659 publication may help lower engine emissions by re-circulating the exhaust to the intake passage of the engine, the system may still be less than optimal. Specifically, the system of the '659 publication may be applicable to four-stroke engines. Two-stroke engines, which do not have discrete intake and exhaust strokes, may experience problems with pumping the exhaust from the donor cylinders back into the intake passage of the engine. Additionally, arranging the donor cylinders at locations in between the non-donor cylinders along the bank of cylinders may increase the size of the exhaust manifold associated with the donor cylinders and cause problems with packaging other components associated with the EGR system within the engine system.

One exemplary EGR system for a two-stroke engine is disclosed in U.S. Patent Application Publication No. US 2013/0081392 A1 to Klingbeil that published on Apr. 4, 2013 ("the '392 publication"). The '392 publication discloses a two-stroke engine having a plurality of donor cylinders and a plurality of non-donor cylinders. The engine also includes two compressors connected to a single turbine via a single shaft. The compressors supply air to the donor cylinders and the non-donor cylinders, respectively. Exhaust generated in the donor cylinders is routed back to mix with the air supplied to the non-donor cylinders. The '392 publication also discloses a bypass valve allowing some of the compressed air from the donor cylinders to mix with the compressed air supplied to the non-donor cylinders. This configuration can assist in reduction of EGR rate to the non-donor cylinders and assist in over-boosting of the donor cylinders.

While the system of the '392 publication can help control the EGR rate, the system may still be less than optimal. Specifically, by having two compressors connected to a single turbine, the system of the '392 publication may experience problems during start up and when transitioning to higher loads. In addition, the bypass valve of the '392 publication allows some of the compressed air from the donor cylinders to mix with the compressed air supplied to the non-donor cylinders, but does not allow some of the compressed air from the non-donor cylinders to mix with the compressed air supplied to the donor cylinders. In some situations (e.g., during start up and when transitioning to higher loads), it may be desirable to allow some of the compressed air from the non-donor cylinders to mix with the compressed air supplied to the donor cylinders.

The engine system of the present disclosure solves one or more of the problems set forth above and/or other problems in the art.

SUMMARY

In one aspect, the present disclosure is directed to an engine system having donor cylinders and non-donor cylinders. The engine system may include a first intake, manifold configured to distribute air into the non-donor cylinders, and a second intake manifold configured to distribute air into the donor cylinders. The engine system may also include a first exhaust manifold configured to discharge exhaust from the non-donor cylinders to the atmosphere, and a second exhaust manifold separate from the first exhaust manifold and configured to recirculate exhaust from the donor cylinders to the first intake manifold. The engine system may further include an orifice disposed in between the first intake manifold and the second intake manifold. The orifice may be configured to regulate a flow rate of fluid flowing from the first intake manifold to the second intake manifold. The engine system may further include a controller configured to selectively control the orifice in response to a desired exhaust gas recirculation operating condition.

In another aspect, the present disclosure is directed to a method of operating an engine having donor cylinders and non-donor cylinders. The method may include distributing air through a first intake manifold into the non-donor cylinders, and distributing air through a second intake manifold into the donor cylinders. The method may also include discharging exhaust from the non-donor cylinders through a first exhaust manifold to the atmosphere, and recirculating exhaust from the donor cylinders through a second exhaust manifold to the first intake manifold. The second exhaust manifold may be separate from the first exhaust manifold. The method may further include selectively adjusting a flow rate of fluid flowing from the first intake manifold to the second intake manifold based on a desired exhaust gas recirculation operating condition.

In yet another aspect, the present disclosure is directed to an engine system having a two-stroke engine. The engine system may include a first cylinder bank including six non-donor cylinders and two donor cylinders, and a second cylinder bank including six non-donor cylinders and two donor cylinders. The engine system may also include a first intake manifold configured to distribute air into the non-donor cylinders of the engine, and a second intake manifold configured to distribute air into the donor cylinders of the engine. The engine system may further include a first exhaust manifold configured to discharge exhaust from the non-donor cylinders to the atmosphere, and a second exhaust manifold separate from the first exhaust manifold and configured to recirculate exhaust from the donor cylinders to the first intake manifold. The engine system may further include an orifice disposed in between the first intake manifold and the second intake manifold. The orifice may be configured to regulate a flow rate of fluid flowing from the first intake manifold to the second intake manifold. The engine system may further include a controller configured to selectively control the orifice in response to a requested engine load.

BRIEF DESCRIPTION OF THE DRAWINGS

FIG. 1. is a schematic illustration of an exemplary disclosed engine system.

DETAILED DESCRIPTION

FIG. 1 illustrates an exemplary engine system 10. In the disclosed embodiment, engine system 10 includes a two-stroke diesel engine 12. It is contemplated that, in other embodiments, engine 12 may be another type of engine, for example, a four-stroke diesel engine, a two-stroke or four-stroke gasoline engine, or a two-stroke or four-stroke gaseous-fuel-powered engine. Engine 12 may include, among other things, an engine block 14 at least partially defining a plurality of cylinders 16, 18.

A piston (not shown) may be slidably disposed within each cylinder 16, 18 to reciprocate between a top-dead-center position and a bottom-dead-center position, and a cylinder head (not shown) may be associated with each cylinder 16, 18. Each cylinder 16, 18, piston, and cylinder head may together at least partially define a combustion chamber. In the illustrated embodiment, engine 12 includes sixteen cylinders 16, 18 arranged in a V-configuration (i.e., a configuration having first and second banks 20, 22 or rows of cylinders 16, 18). However, it is contemplated that engine 12 may include a greater or lesser number of cylinders 16, 18 and that cylinders 16, 18 may be arranged in an inline configuration, in an opposing-piston configuration, or in another configuration, if desired.

In the disclosed embodiment, cylinders 18 are donor cylinders, while cylinders 16 are non-donor cylinders. For the purposes of this disclosure, a donor cylinder is an engine cylinder, which donates some or all of the exhaust generated by that cylinder for recirculation through any of the cylinders in the engine. In contrast, a non-donor cylinder is an engine cylinder from which all the exhaust is discharged to the atmosphere, and which does not donate any exhaust for recirculation through any of the cylinders in the engine. As illustrated in FIG. 1, four donor cylinders 18 are located immediately adjacent to each other at one end of engine 12 with two donor cylinders 18 being located on each bank 20, 22. The rest of the cylinders in banks 20, 22 may be non-donor cylinders 16. However, in other embodiments, it is contemplated that either bank 20, 22 may contain any number of donor cylinders 18. It is also contemplated that banks 20, 22 may each contain only non-donor cylinders, only donor cylinders, or a combination of both non-donor cylinders and donor cylinders.

As shown in FIG. 1, it may be preferable to select adjacent cylinders at one end of engine 12 as donor cylinders to help ensure compact packaging of components within engine system 10. Selecting non-adjacent cylinders as donor cylinders may require design of more complicated passages to collect the exhaust from the non-adjacent donor cylinders, which may lead to an increase in a size of engine 12.

Engine system 10 may also include multiple separate sub-systems associated with engine 12 to cooperate and facilitate the production of power. For example, engine system 10 may include an air induction system 24 and an exhaust system 26. Air induction system 24 may be configured to direct air or an air and fuel mixture into engine 12 for subsequent combustion. Exhaust system 26 may exhaust byproducts of combustion to the atmosphere.

Air induction system 24 may include multiple components configured to condition and introduce compressed air into cylinders 16, 18. For example, air induction system 24 may include a first compressor 28 configured to compress air and direct the compressed air to first intake manifolds 30 via passage 34. Intake manifolds 30 may direct the compressed air into non-donor cylinders 16. Although two separate intake manifolds 30 associated with banks 20, 22 are depicted in FIG. 1, one of ordinary skill in the art would recognize that the two intake manifolds 30 may be combined into a single intake manifold 30. Compressor 28 may embody a fixed geometry compressor, a variable geometry compressor, or any other type of compressor configured to receive air and compress the air to a desired pressure level.

Air induction system 24 may also include a second compressor 36 configured to compress air and direct the compressed air to second intake manifolds 32 via passage 50. Intake manifolds 32 may direct the compressed air into donor cylinders 18. In some embodiments, intake manifolds 32 may be fluidly connected to intake manifolds 30 via EGR orifices 66, as will be described in more detail below. Although two separate intake manifolds 32 associated with banks 20, 22 are depicted in FIG. 1, one of ordinary skill in the art would recognize that the two intake manifolds 32 may be combined into a single intake manifold 32. Like compressor 28, compressor 36 may embody a fixed geometry compressor, a variable geometry compressor, or any other type of compressor configured to receive air and compress the air to a desired pressure level. It is contemplated that air induction system 24 may also include one or more coolers (not shown) located to cool air compressed by compressors 28, 36 before it enters the combustion chambers of engine 12.

Exhaust system 16 may include, among other things, a first turbine 38 driven by the exhaust from first exhaust manifolds 44 via passage 48 to rotate compressor 28. Exhaust manifolds 44 may receive exhaust generated by non-donor cylinders 16 in banks 20, 22. Exhaust from exhaust manifolds 44 may be directed to turbine 38 via passage 48 before being discharged into the atmosphere.

Although two separate exhaust manifolds 44 associated with banks 20, 22 are depicted in FIG. 1, one of ordinary skill in the art would recognize that the two exhaust manifolds 44 may be combined into a single exhaust manifold 44. Turbine 38 may embody a fixed geometry turbine, a variable geometry turbine, or any other type of turbine configured to receive exhaust and convert potential energy in the exhaust to a mechanical rotation. Turbine 38 may be directly and mechanically connected to compressor 28 by way of a shaft 40 to form a first turbocharger 42. As the hot exhaust gases exiting engine 12 move through turbine 38 and expand therein, turbine 38 may rotate and drive compressor 28, to pressurize inlet air.

Exhaust system 16 may also include a second turbine 52 that is also driven by the exhaust from exhaust manifolds 44 via passage 48 to rotate compressor 36. Exhaust from exhaust manifolds 44 may be directed to turbine 52 via passage 48 before being discharged into the atmosphere. Like turbine 38, turbine 52 may embody a fixed geometry turbine, a variable geometry turbine, or any other type of turbine configured to receive exhaust and convert potential energy in the exhaust to a mechanical rotation. Turbine 52 may be directly and mechanically connected to compressor 36 by way of a shaft 54 to form a second turbocharger 56. As the hot exhaust gases exiting engine 12 move through turbine 52 and expand therein, turbine 52 may rotate and drive compressor 36, to pressurize inlet air. It is contemplated that exhaust system 26 may also include different or additional components than described above such as, for example, bypass components, an exhaust compression or restriction brake, an attenuation device, and other known components, if desired.

After passing through turbines 38, 52, the exhaust may first be treated before being discharged to the atmosphere. In particular, one or more exhaust treatment devices (not shown) may be located to receive the exhaust from turbines 38, 52. The exhaust treatment devices may include, for example, a particulate filter, one or more catalysts, or another treatment device known in the art. The exhaust treatment devices may be configured to remove, trap, reduce, or otherwise convert pollutants in the exhaust flow of engine 12 to innocuous substances.

Engine system 10 may also include an exhaust gas recirculation (EGR) system 60 configured to selectively divert exhaust from second exhaust manifolds 46 to air induction system 24. Exhaust manifolds 46 may be separate from exhaust manifolds 44. As used in this disclosure, separate means completely disconnected or isolated. Thus, there may be no passage connecting exhaust manifolds 44 with exhaust manifolds 46. Exhaust manifolds 46 may receive exhaust generated by donor cylinders 18 in banks 20, 22. Exhaust from exhaust manifolds 46 may be redirected back into passage 34, where it is mixed with air from compressor 28 before entering non-donor cylinders 16. Although two separate exhaust manifolds 46 associated with banks 20, 22 are depicted in FIG. 1, one of ordinary skill in the art would recognize that the two exhaust manifolds 46 may be combined into a single exhaust manifold 46.

EGR system 60 may include an EGR passage 62 that is fluidly connected at a first end with one or more donor cylinders 18 in a manner separate from non-donor cylinders 16 and at a second end with air induction system 24. In the disclosed exemplary embodiment, EGR passage 62 is fluidly connected to exhaust manifolds 46 at the first end and connected to passage 34 at the second end. EGR system 60 may also include an EGR cooler 64, one or more EGR orifices 66, and a controller 70.

EGR cooler 64 may be located within EGR passage 62 and configured to cool exhaust passing therethrough. The cooled exhaust may mix with fresh air supplied by compressor 28 in passage 34 upstream of intake manifolds 30. The air-exhaust mixture may be directed to non-donor cylinders 16 and/or donor cylinders 18. EGR cooler 64 may be any type of heat exchanger known in the art that is configured to cool exhaust flowing through EGR passage 62. For example, EGR cooler 64 may be an air-to-liquid type of heat exchanger that receives coolant from and returns coolant to engine 12 (e.g., engine block 14). The coolant may be passed through spaced apart channels within EGR cooler 64 and used to absorb heat from exhaust passing through adjacent channels. It should be noted that EGR cooler 64 may alternatively be another type of heat exchanger, if desired, such as an air-to-air heat exchanger.

EGR orifices 66 may be disposed in between intake manifolds 30, 32 to establish a fluid communication between intake manifolds 30, 32. EGR orifices 66 may be configured to regulate a flow of fluid (e.g., a mass flow rate of air and/or exhaust) passing from intake manifold 30 to intake manifold 32. Although two separate EGR orifices 66 associated with banks 20, 22 are depicted in FIG. 1, in other embodiments with only single intake manifolds 30, 32, there may be only a single EGR orifice 66. EGR orifices 66 may each embody, for example, a variable orifice that is solenoid-driven, which can be continuously-adjusted between a fully-closed position and a fully-open position. Alternatively, EGR orifices 66 may be capable of only being fully-closed or fully-opened. In some embodiments, EGR orifice 66 may be controlled based on a desired EGR operating condition via controller 70, as will be described in more detail below.

Controller 70 may be configured to control the operation of engine system 10 and/or EGR system 60. For example, controller 70 may receive data indicative of an operational condition of engine 12 and/or an actual flow rate, temperature, pressure, and/or constituency of exhaust within exhaust manifolds 44, 46 and/or EGR system 60, Such data may be received from another controller or computer (not shown), from sensors strategically located throughout engine system 10, and/or from a user of engine 12. Controller 70 may then utilize stored algorithms, equations, subroutines, look-up maps and/or tables to analyze the operational condition data and determine a corresponding desired EGR operating condition (e.g., a flow rate and/or constituency of exhaust within passage 48 that sufficiently reduces the amount of pollutants discharged to the atmosphere). Based on the desired flow rate and/or constituency, controller 70 may then selectively control EGR orifices 66, such that the desired amounts of exhaust may be supplied by EGR system 60 into intake manifolds 30 and/or intake manifolds 32.

Controller 70 may embody a single microprocessor, multiple microprocessors, digital signal processors (DSPs), etc, that include means for controlling an operation of engine system 10 and/or EGR system 60. Numerous commercially available microprocessors can be configured to perform the functions of controller 70. It should be appreciated that controller 70 could readily embody a microprocessor separate from that controlling other machine-related functions, or that controller 70 could be integral with a. machine microprocessor and be capable of controlling numerous machine functions and modes of operation. If separate from the general machine microprocessor, controller 70 may communicate with the general machine microprocessor via data links or other methods. Various other known circuits may be associated with controller 70, including power supply circuitry, signal-conditioning circuitry, actuator driver circuitry (i.e., circuitry powering solenoids, motors, or piezo actuators), and communication circuitry.

In some embodiments, controller 70 may selectively control EGR orifices 66 in response to the desired EGR operating condition. For example, in certain situations, the desired EGR operating condition may depend on a requested load on engine 12. Specifically, controller 70 may determine that a load change is required and, thus, a change in EGR operation is required. For instance, when a higher load is required, controller 70 may determine that more exhaust should be recirculated back into intake manifolds 30. Subsequently, controller 70 may increase an opening of EGR orifices 66 to increase the mass flow rate of fluid (e.g., air and/or exhaust) that is forced into intake manifolds 32. As pressure in donor cylinders 18 increases, controller 70 may gradually close EGR orifices 66, creating a pressure differential between donor cylinders 18 and non-donor cylinders 16. In particular, a pressure of donor cylinders 18 may be greater than a pressure of non-donor cylinders 16. This pressure differential may cause exhaust from donor cylinders 18 to be recirculated back into non-donor cylinders 16. With more exhaust being recirculated into non-donor cylinders 16, this may increase a power output of engine 12, thereby achieving the higher load requirements. Together, EGR orifices 66 and controller 70 may help to ensure the desired EGR operating condition is achieved at various loading states.

Controller 70 may also function to control one or more operating parameters associated with each cylinder 16, 18 to help to achieve the desired EGR operating condition. In some embodiments, non-donor cylinders 16 and donor cylinders 18 may have substantially different cylinder pressures, air-to-fuel ratios, and/or fuel injection timings. For example, controller 70 may cause donor cylinders 18 to have higher cylinder pressures, higher air-to-fuel ratios, and more frequent fuel injections than non-donor cylinders 16 to create a more potent exhaust gas. It is contemplated that, in some embodiments, donor cylinders 18 may also have a different piston shape than non-donor cylinders 16 to help to obtain higher cylinder pressures in donor cylinders 18 than non-donor cylinders 16. For instance, non-donor cylinders 16 may have a piston bowl, while donor cylinders 18 may not have a piston bowl. This may allow donor cylinders 18 to have a smaller cylinder volume, resulting in higher cylinder pressures that further increase the potency of the exhaust gas. As a result, the more potent exhaust gas may provide a smaller volumetric flow rate of exhaust with the same engine benefits. This may allow EGR system 60 to utilize smaller EGR components, and thereby, reduce an overall size of engine system 10.

As shown in FIG. 1, it may be preferable for shaft 40 of turbocharger 42 to be directly connected to a crankshaft 68 associated with engine 12 via an overrunning clutch 72. This direct connection may allow turbocharger 42 to utilize the power generated by engine 12 and not rely solely on turbine 38 to power compressor 28. Thus, during start up conditions and when transitioning to higher loads, compressor 28 may be provided with sufficient power to operate in an efficient manner. On the other hand, turbocharger 52 may utilize only the power generated by turbine 52 to power compressor 36 (i.e., shaft 52 may not be connected to crankshaft 68).

INDUSTRIAL APPLICABILITY

The disclosed engine system may be used in any machine or power system application where it is beneficial to reduce an amount of pollutants discharged into the atmosphere. The disclosed engine system may find particular applicability with two-stroke engines, which do not have discrete intake and exhaust strokes. Specifically, the disclosed EGR orifices may help to pump exhaust from the donor cylinders to an intake to the non-donor cylinders, allowing EGR to be achieved without discrete intake and exhaust strokes. The disclosed EGR system may also allow EGR to be achieved without the use of an EGR blower or similar device. The disclosed engine system may provide an improved method for reducing the amount of pollutants in the exhaust discharged to the atmosphere. An exemplary operation of engine system 10 will now be described.

During operation of engine system 10, air or a mixture of air and fuel may be pressurized by compressors 28, 36 and directed into non-donor cylinders 16, 18, respectively for subsequent combustion. Combustion of the air/fuel mixture may result in mechanical power being generated and directed from engine system 10 by way of the rotating crankshaft 68. By-products of combustion, namely exhaust and heat, may flow from non-donor cylinders 16 through turbines 38, 52 to the atmosphere.

Exhaust and heat produced in donor cylinders 18 of engine system 10 may be recirculated by exhaust manifolds 46 into intake manifolds 30. EGR cooler 54 may receive exhaust from exhaust manifolds 46 and may cool the exhaust before it mixes with compressed air from compressor 28 in intake manifold 30, which may distribute the exhaust-air mixture to non-donor cylinders 16. The recirculation of exhaust may help dilute the mixture of fuel and air and increase the thermal capacity within non-donor cylinders 16, resulting in a lower combustion temperature. The lower combustion temperature in non-donor cylinders 16 may help reduce an amount of pollutants produced during combustion.

During an exemplary operation of engine system 10, controller 70 may selectively control EGR orifices 66 to help deliver a desired amount of exhaust from exhaust manifolds 46 to intake manifolds 30. For example, controller 70 may increase an opening of EGR orifices 66 to increase the amount of air directed from intake manifolds 30 to intake manifolds 32 in response to a higher engine load request. This may cause the pressure in donor cylinders 18 to increase, at which point, controller 70 may gradually close EGR orifices 66, causing the pressure in donor cylinders 18 to be greater than the pressure in non-donor cylinders 16. This pressure differential may cause exhaust from donor cylinders 18 to be recirculated back into non-donor cylinders 16.

The use of EGR orifices 66 may provide a reduced pressure within EGR system 60, Specifically, EGR orifices 66 may be selectively controlled to create a pressure differential between intake manifolds 30, 32, such that exhaust from exhaust manifolds 46 is pumped from donor cylinders 18 back to non-donor cylinders without requiring an EGR blower or similar device. As a result, the disclosed engine system provides a reduced pressure within EGR system 60, which may be especially suitable for steady state operations.

It will be apparent to those skilled in the art that various modifications and variations can be made to the disclosed engine system without departing from the scope of the disclosure, Other embodiments of the engine system will be apparent to those skilled in the art from consideration of the specification and practice of the engine system disclosed herein. It is intended that the specification and examples be considered as exemplary only, with a true scope of the disclosure being indicated by the following claims and their equivalents.

What is claimed is:

1. A method of operating an engine having donor cylinders and non-donor cylinders, comprising:
   distributing air through a first intake manifold into the non-donor cylinders;
   distributing air through a second intake manifold into the donor cylinders;
   discharging exhaust from the non-donor cylinders through a first exhaust manifold to the atmosphere;
   recirculating exhaust from the donor cylinders through a second exhaust manifold to the first intake manifold, the second exhaust manifold being separate from the first exhaust manifold; and
   selectively adjusting a flow rate of fluid flowing from the first intake manifold to the second intake manifold based on a desired exhaust gas recirculation operating condition.

2. The method of claim 1, further including selectively adjusting a flow rate of fluid flowing from the first intake manifold to the second intake manifold based on a requested engine load.

3. The method of claim 2, further including, when a higher engine load is requested, increasing an amount of exhaust that is recirculated from the donor cylinders by increasing the flow rate of fluid flowing from the first intake manifold to the second intake manifold.

4. The method of claim 2, further including, when a pressure in the donor cylinders is greater than a pressure in the non-donor cylinders, decreasing the flow rate of fluid flowing between the first intake manifold and the second intake manifold.

5. The method of claim 1, further including cooling exhaust that is recirculated from the donor cylinders.

6. The method of claim 1, further including compressing air and directing the compressed air separately to each of the first and second intake manifolds.

7. The method of claim 1, further including recirculating exhaust to the non-donor cylinders when an orifice between the first intake manifold and the second intake manifold is closed.

8. The method of claim 1, further including mixing the recirculated exhaust with compressed air before entering the first manifold.

9. The method of claim 1, further including compressing the air distributed through the first intake manifold via a crankshaft of the engine and exhaust flowing from the first exhaust manifold, and compressing the air distributed through the second intake manifold via exhaust flowing from the second exhaust manifold.

10. An engine system having donor cylinders and non-donor cylinders, comprising:
    a first intake manifold configured to distribute air into the non-donor cylinders;
    a second intake manifold configured to distribute air into the donor cylinders;
    a first exhaust manifold configured to discharge exhaust from the non-donor cylinders to the atmosphere;
    a second exhaust manifold separate from the first exhaust manifold and configured to recirculate exhaust from the donor cylinders to the first intake manifold;
    an orifice disposed in between the first intake manifold and the second intake manifold, the orifice being configured to regulate a flow rate of fluid flowing from the first intake manifold to the second intake manifold; and
    a controller configured to selectively control the orifice in response to a desired exhaust gas recirculation operating condition.

11. The engine system of claim 10, wherein the desired exhaust gas recirculation operating condition is based on a requested engine load.

12. The engine system of claim 11, wherein, when a higher engine load is requested, the controller is configured to increase an amount of exhaust that is recirculated from the donor cylinders by increasing an opening of the orifice.

13. The engine system of claim 12, wherein, when a pressure is the donor cylinders is greater than a pressure in the non-donor cylinders, the controller is configured to close the orifice.

14. fhe engine system of claim 10, further including a cooler configured to cool exhaust that is recirculated from the donor cylinders.

15. The engine system of claim 10, further including:
    a first compressor configured to compress air and direct the compressed air to the first intake manifold;
    a first turbine connected to drive the first compressor and configured to receive exhaust from the first exhaust manifold;
    a second compressor configured to compress air and direct the compressed air to the second intake manifold; and
    a second turbine connected to drive the second compressor and configured to receive exhaust from the first exhaust manifold.

16. The engine system of claim 15, wherein the exhaust recirculated from the donor cylinders is recirculated to a location downstream of the first compressor.

17. The engine system of claim 15, wherein the first turbine is driven by a crankshaft of the engine and exhaust flowing from the first exhaust manifold, and the second turbine is driven by exhaust flowing from the second exhaust manifold.

18. The engine system of claim 10, wherein the donor cylinders are located immediately adjacent to one another at one end of the engine with two donor cylinders being located on each of first and second banks of cylinders.

19. The engine system of claim 10, wherein, when the orifice is closed, exhaust is recirculated from the donor cylinders to the non-donor cylinders.

20. An engine system having a two-stroke engine, comprising:
    a first cylinder bank including six non-donor cylinders and two donor cylinders;
    a second cylinder bank including six non-donor cylinders and two donor cylinders;
    a first intake manifold configured to distribute air into the non-donor cylinders of the engine;
    a second intake manifold configured to distribute air into the donor cylinders of the engine;
    a first exhaust manifold configured to discharge exhaust from the non-donor cylinders to the atmosphere;
    a second exhaust manifold separate from the first exhaust manifold and configured to recirculate exhaust from the donor cylinders to the first intake manifold;
    an orifice disposed in between the first intake manifold and the second intake manifold, the orifice being configured to regulate a flow rate of fluid flowing from the first intake manifold to the second intake manifold; and
    a controller configured to selectively control the orifice in response to a requested engine load.

* * * * *